(12) United States Patent
Bergano

(10) Patent No.: US 6,459,515 B1
(45) Date of Patent: Oct. 1, 2002

(54) METHOD AND APPARATUS FOR TRANSMITTING A WDM OPTICAL SIGNAL HAVING STATES OF POLARIZATION THAT ARE PAIRWISE ORTHOGONAL

(75) Inventor: Neal S. Bergano, Lincroft, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/267,325

(22) Filed: Mar. 12, 1999

(51) Int. Cl.$^7$ ............................. H04J 14/02; H04J 14/06
(52) U.S. Cl. ........................ 359/124; 359/122; 359/133; 359/156; 359/161; 359/180
(58) Field of Search ................................. 359/133, 124, 359/122, 156, 161, 180

(56) References Cited

U.S. PATENT DOCUMENTS 5,841,557 A * 11/1998 Otsuka et al. .............. 359/122
6,134,033 A * 10/2000 Bergano et al. ............ 359/122

\* cited by examiner

Primary Examiner—Kinfe-Michael Negash

(57) ABSTRACT

A method and apparatus is provided for transmitting an optical signal having a total number of channels that are dividable into a prescribed number of wavebands. The method includes the step of generating a first series of optical signals corresponding to each of the wavebands. The first series of optical signals includes a plurality of optical channels, which are sequentially numbered from 1 to N from lowest to highest wavelength. Within each waveband, a state-of-polarization of predetermined odd-numbered channels is oriented to be substantially orthogonal to a state of polarization of predetermined even-numbered channels by directing the predetermined odd-numbered channels and the predetermined even-numbered channels through orthogonally polarizing inputs of a polarization coupler. The odd-numbered channels and the even-numbered channels within each waveband may be directed through first and second wavelength combiners, respectively, prior to orienting their states of polarization. The orthogonal relationship between the states of polarization of odd and even-numbered channels within each waveband advantageously limits the four-wave mixing products that can be generated in the optical transmitter and the optical transmission path to which it is typically coupled.

58 Claims, 7 Drawing Sheets

METHOD AND APPARATUS FOR TRANSMITTING A WDM OPTICAL SIGNAL HAVING STATES OF POLARIZATION THAT ARE PAIRWISE ORTHOGONAL

FIELD OF THE INVENTION

The invention relates generally to wavelength division multiplexed transmission systems, and more particularly to a transmitter employed in wavelength division multiplexed transmission systems which increases spectral efficiency by reducing four-wave mixing.

BACKGROUND OF THE INVENTION

Wavelength-division multiplexing is expected to be increasingly utilized in undersea and transcontinental terrestrial optical transmission systems due, in part, to the large bandwidth capacity such multiplexing provides. One way of increasing the total transmission capacity of such systems is to more efficiently use the available spectral bandwidth such as by decreasing the spacing between adjacent ones of the multiplexed channels. Unfortunately, wavelength division multiplexed transmission systems are susceptible to performance limitations due to polarization dependent effects such as cross-talk between the multiplexed channels. Cross-talk, which is primarily caused by the non-linear index of refraction of optical transmission fibers, increases as the channel spacing decreases. Four-wave mixing is one significant deleterious effect that produces cross-talk.

U.S. application Ser. No. 09/031,018, now U.S. Pat. No. 6,134,033 discloses an optical transmitter that generates a WDM signal having even-numbered channels in a state of polarization (SOP) orthogonal to the SOP of the odd-numbered channels. This arrangement advantageously limits the four-wave mixing products that can be generated in the transmitter and the optical transmission path to which it is typically coupled.

Wavelength division multiplexed systems must also employ dispersion management techniques. As the per channel data rates of such system increase, the interplay of dispersion and fiber nonlinearity needs to be more carefully managed. Typically the transmission line is designed to have an average dispersion value of zero. In the case of WDM systems with a non-zero dispersion slope, however, only one channel can be arranged to have an average dispersion of zero. The remaining channels will have some net nonzero dispersion due to the dispersion slope of the optical fibers forming the transmission line. One technique for overcoming this limitation at intermediate points along the transmission path (i.e., in the undersea plant in undersea transmission systems) in WDM systems is disclosed in U.S. application Ser. No. 08/759,493, now U.S. Pat. No. 6,137,604. As discussed therein, it is useful to divide the usable optical bandwidth of the transmission system into sub-bands that individually undergo dispersion compensation before being re-combined. In comparison to other dispersion compensation techniques, more WDM data channels reside near a wavelength corresponding to the average zero dispersion wavelength. However, to implement in a straightforward manner this dispersion management technique at the transmitting terminal, in connection with a signal that has SOPs which are pairwise orthogonal, requires a dispersion compensator that maintains the SOPs of the optical signal.

Unfortunately, a transmitter that offers both dispersion compensation and a signal in which adjacent channels have orthogonal SOPs is difficult to provide because of the unavailability of a simple and inexpensive means for performing dispersion compensation in a polarization maintaining environment.

Accordingly, it would be desirable to provide a transmitter that generates a dispersion-compensated WDM optical signal having SOPs that are pairwise orthogonal without the need for a dispersion compensating element that does not change the SOP of the optical signal.

SUMMARY OF THE INVENTION

In accordance with the present invention, a method and apparatus is provided for transmitting an optical signal having a total number of channels that are dividable into a prescribed number of wavebands. The method includes the step of generating a first series of optical signals corresponding to each of the wavebands. The first series of optical signals includes a plurality of optical channels, which are sequentially numbered from 1 to N from lowest to highest wavelength. Within each waveband, a state-of-polarization of predetermined odd-numbered channels is oriented to be substantially orthogonal to a state of polarization of predetermined even-numbered channels by directing the predetermined odd-numbered channels and the predetermined even-numbered channels through orthogonally polarizing inputs of a polarization coupler. The odd-numbered channels and the even-numbered channels within each waveband may be directed through first and second wavelength combiners, respectively, prior to orienting their states of polarization. The orthogonal relationship between the states of polarization of odd and even-numbered channels within each waveband advantageously limits the four-wave mixing products that can be generated in the optical transmitter and the optical transmission path to which it is typically coupled.

DETAILED DESCRIPTION

Figure 1:
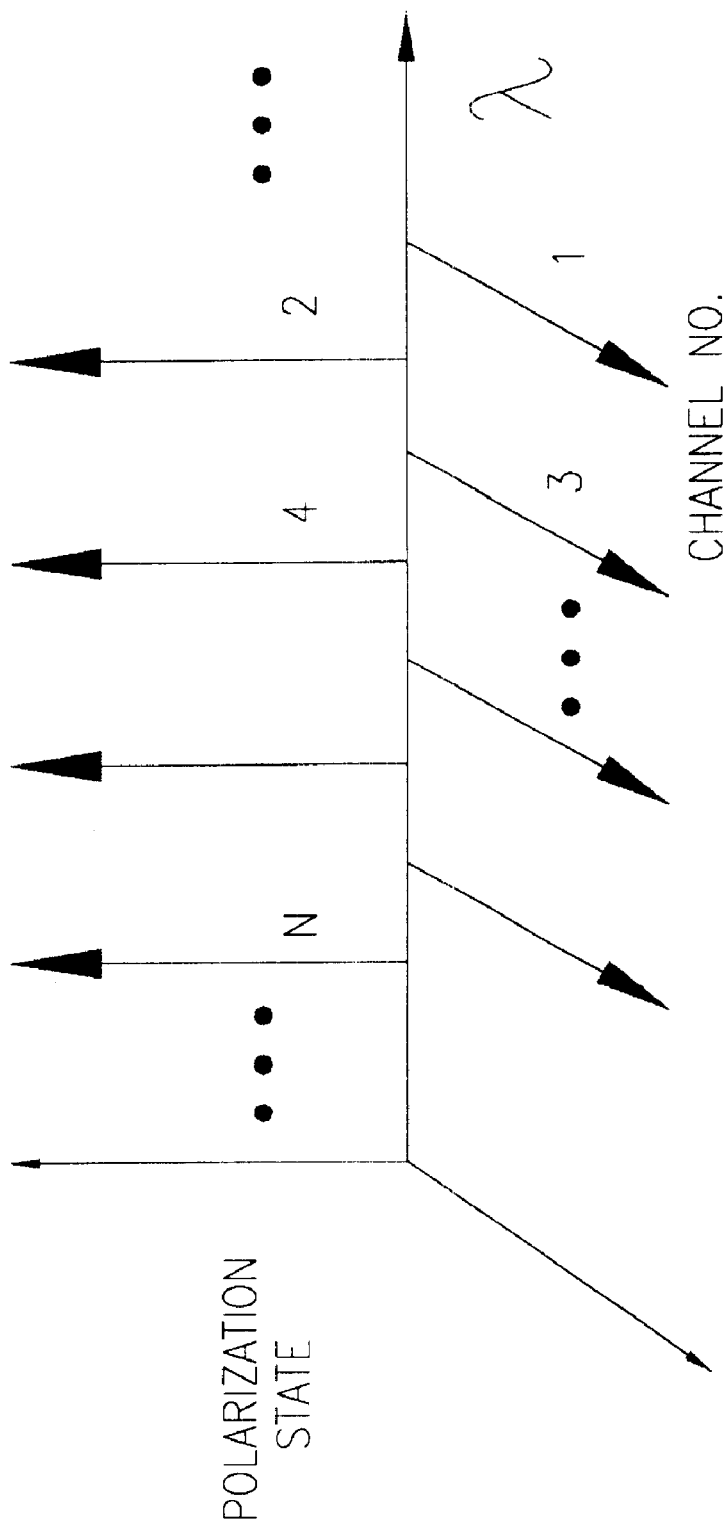
FIG. 1 shows the polarization states of channels within a given waveband contained in the optical signal which is transmitted in accordance with the present invention.

In accordance with the present invention, a WDM optical signal is provided in which the odd-numbered channels within a given portion of the signal's bandwidth have SOPs that are substantially orthogonal to the SOPs of the even-numbered channels within that portion of the bandwidth. FIG. 1 illustrates this orthogonal relationship at some arbitrary instant in time. The preferred substantially orthogonal relationship between SOPs of odd and even-numbered channels advantageously limits the four-wave mixing products that can be generated in the optical transmission path. The reduction of four-wave mixing in this manner is discussed in more detail in Bergano et al., "320 Gb/s WDM Transmission over 7,200 km Using Large Mode Fiber Spans and Chirped Return to Zero Signals," OFC '98 PD12. Referring to FIG. 1, it will be evident that this desirable result is achieved because neighboring channels, for example channels $\lambda_1$ and $\lambda_2$, are substantially precluded from interacting due to their orthogonal SOPs. Channels sharing the same SOP, for example channels $\lambda_1$ and $\lambda_3$, are separated far enough apart in wavelength such that the amplitude of resultant mixing products is minimal.

It should be noted at the onset that the term "channel" as used herein refers to any optical phenomena that is defined by a unique wavelength. Thus, the term channel may refer to a component of a wavelength division multiplexed optical signal having a plurality of components, where each component has a different wavelength. Moreover, as used herein, the term channel may refer to a monochromatic optical signal.

Figure 2:
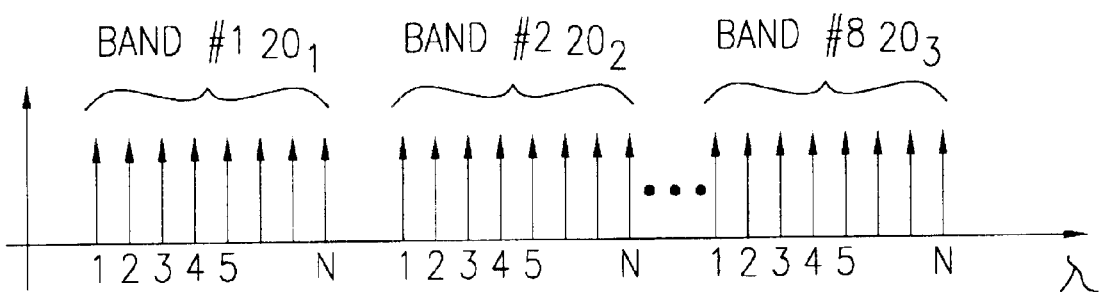
FIG. 2 shows the total bandwidth of an exemplary WDM optical signal employed in the present invention.

FIG. 2 shows the total bandwidth of an exemplary WDM optical signal employed in the present invention. The optical signal comprises 64 channels that are divided into eight wavebands $20_1$, $20_2$, . . . $20_8$. For reasons that will be explained below, each waveband is separated by a guard band that will typically have a spectral width greater than the separation between adjacent channels within any given waveband. While the WDM signal shown in FIG. 2 comprises 64 channels, one of ordinary skill in the art will recognize that the present invention encompasses a WDM signal comprising any number of channels. Moreover, the channels may be divided into any desired number of wavebands that may or may not each incorporate the same number of channels.

Figure 3:
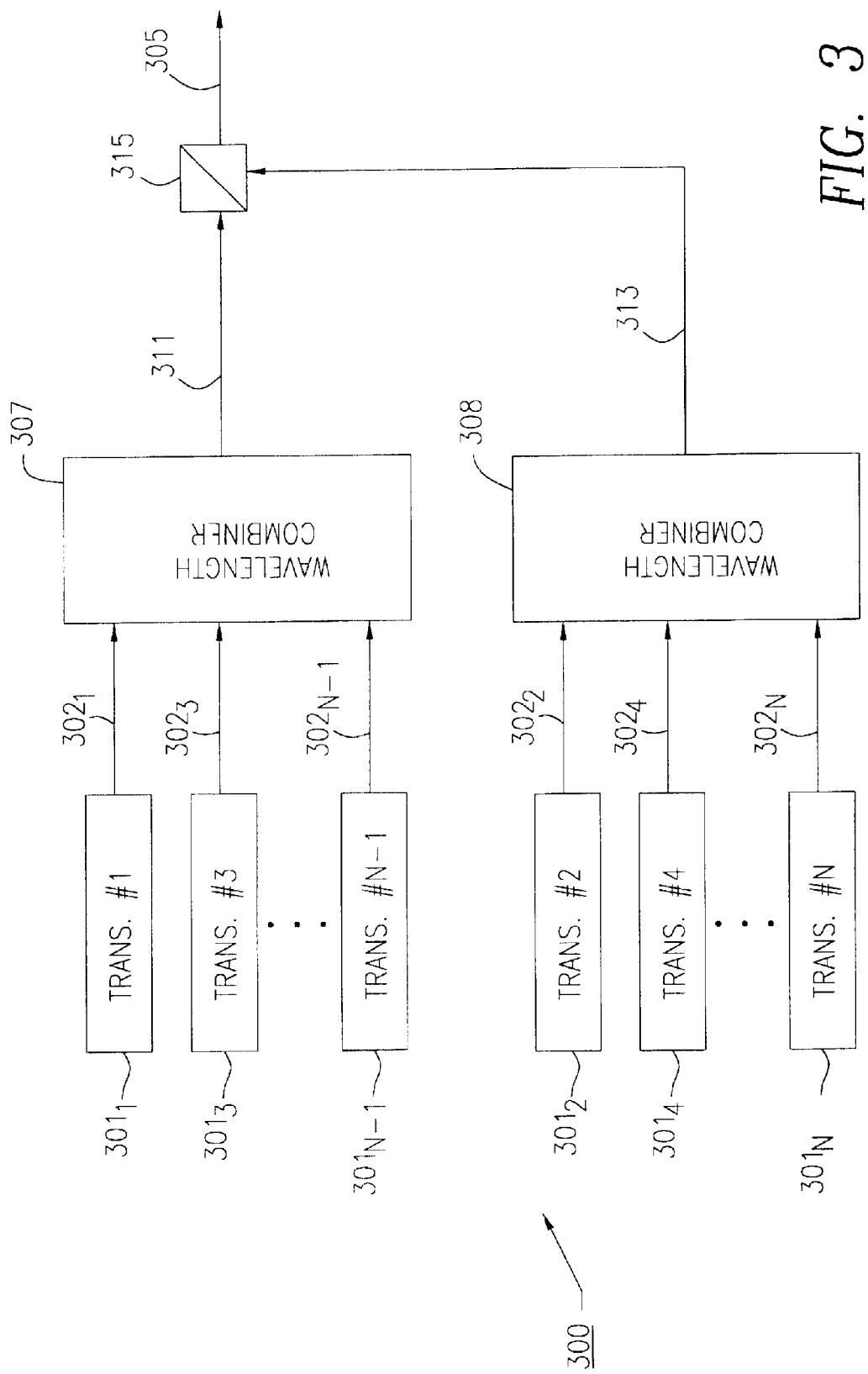
FIG. 3 shows a simplified block diagram of an illustrative embodiment of an optical transmitter unit.

FIG. 3 is a simplified block diagram of an optical transmitter unit 300 that produces a single one of the wavebands $20_1$, $20_2$, . . . $20_8$ shown in FIG. 2. The eight wavebands $20_1$, $20_2$, . . . $20_8$ that make up the WDM signal will each be produced by a transmitter unit similar to transmitter unit 300. Accordingly, as detailed below in connection with FIG. 4, the optical transmitter constructed in accordance with the present invention will comprise a series of such transmitter units, with the number of transmitter units corresponding to the number of wavebands that are employed.

As shown, optical transmitter unit 300 includes a plurality of optical sources $301_1$, $301_2$, . . . $301_N$. The plurality of optical sources $301_1$, $301_2$, . . . $301_N$ which could be, for example, wavelength-tunable semiconductor lasers, are utilized to generate a plurality of optical data signals $302_1$, $302_2$, . . . $302_N$ each having a different wavelength $\lambda_1$, $\lambda_2$, . . . $\lambda_N$, respectively, thus defining the N optical channels of the given waveband. The N optical channels belong to one of the wavebands shown in FIG. 2. Optical sources $301_1$, $301_2$, . . . $301_N$ may be adapted such that optical data channels $302_1$, $302_2$, . . . $302_N$ have substantially identical optical power. One or more of the optical sources 301 may be adapted so that optical channels 302 carry information supplied by data sources (not shown) using conventional techniques. For discussion purposes, the channels may be sequentially numbered 1, 2, . . . N, from lowest to highest wavelength. In this illustrative example of the invention the chaniel wavelengths are uniformly spaced by, for example, 0.3 nm. However, as previously mentioned, in other applications of the invention it may be desirable to utilize non-uniform channel wavelength spacing.

The plurality of optical sources $301_1$, $301_2$, . . . $301_N$, are arranged in sequential order so that optical channels $302_1$, $302_2$, . . . $302_N$ are produced in ascending (or descending) wavelength order from $\lambda_1$, to $\lambda_N$. As shown in FIG. 3, the optical sources 301 are grouped into two sets, a first set of odd-numbered optical sources $301_1$, $301_3$, . . . $301_{N-1}$ and a second set of even-numbered optical sources $301_2$, $301_4$, . . . $301_N$, where N is an even integer. That is, the first set of optical sources produces, in sequential order, the odd-numbered wavelengths $\lambda_1$, $\lambda_3$, . . . $\lambda_{N-1}$ while the second set of optical sources produces, in sequential order, the even-numbered wavelengths $\lambda_2$, $\lambda_4$, . . . $\lambda_N$. Even-numbered wavelengths are directed to a first wavelength combiner 307 while the odd-numbered wavelengths are directed to a second wavelength combiner 308. The wavelength combiners 307 and 308 may comprise, for example, directional couplers, star couplers or wavelength routers. In preferred embodiments of the invention, each set of optical sources imparts a large degree of polarization (i.e., nearly unity) to the signals so that the signals can be subsequently passed through a polarizer without distortion. The orientation of the polarization may be arbitrarily chosen as long as its value is substantially the same among the channels produced by each set of transmitters. If significant loss and distortion can be tolerated, however, the optical sources need not impart a large degree of polarization. The following discussion assumes that a degree of polarization near unity is imparted to the optical signals. Wavelength combiner 307 forms an output signal 311 comprising N/2 optical channels with each channel being in substantially the same polarization state. Similarly, wavelength combiner 308 forms an output signal 313 comprising N/2 optical channels with each channel being in substantially the same polarization state. Output signals 311 and 313 are directed to a polarization combiner 315 for combining the N/2 channels of output signals 311 and 313. The N/2 channels of output signal 311 are polarized by polarization combiner 315 in a first polarization state and the N/2 channels of output signal 313 are polarized by polarization combiner 315 in a second polarization state that is orthogonal to the first polarization state. The resulting output from the polarization combiner 315 is the one of the wavebands $20_1$, $20_2$, . . . $20_N$ shown in FIG. 2. That is, polarization combiner 315 provides an output signal in which adjacent channels are orthogonally polarized. One of ordinary skill in the art will recognize that the multiplexing functionality of the polarization combiner 315 may in the alternative be accomplished by a conventional directional coupler in which the SOP's are carefully adjusted.

Figure 4:
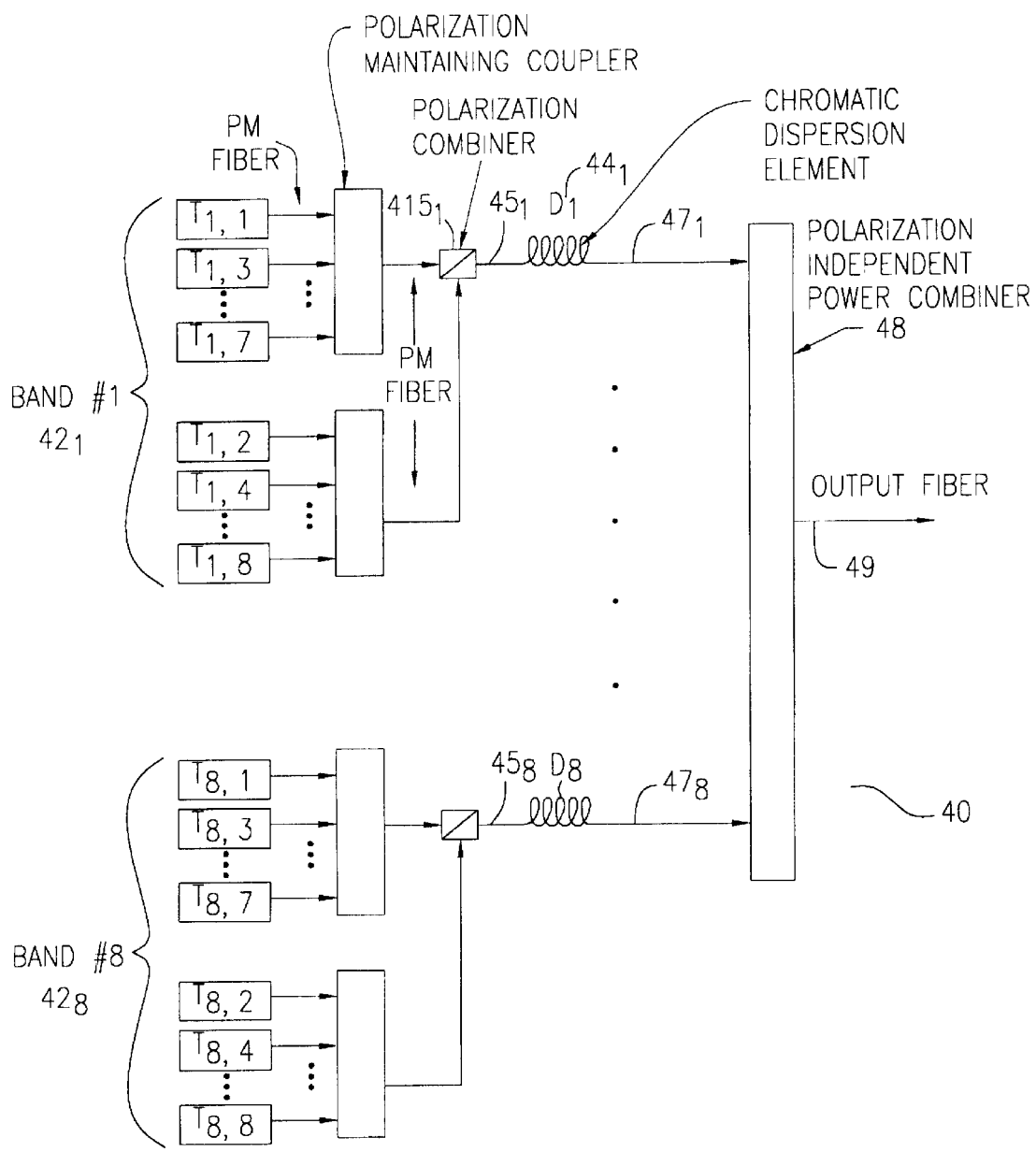
FIG. 4 shows a simplified block diagram of an illustrative embodiment of an optical transmitter constructed in accordance with the present invention.

FIG. 4 shows a simplified block diagram of an optical transmitter 40 constructed in accordance with the present invention. The optical transmitter 40 comprises a plurality of the transmitter units 42 of the type shown in FIG. 3 and produces the WDM optical signal shown in FIG. 2, which in this illustrative example comprises 64 channels divided into 8 wavebands of 8 channels each. For clarity of description, the transmitting sources shown in FIG. 4 are denoted $T_{x,y}$, where x refers to the waveband number and y refers to the particular channel within waveband x. That is, for example, $T_{7,6}$ refers to the sixth channel in waveband seven, or equivalently, channel number 54.

In accordance with the present invention, dispersion compensation is provided on a waveband by waveband basis at the transmitter (It should be noted that this process will typically provide a pre-compensation of dispersion that will generally be followed by additional dispersion compensation at intermediate points along the transmission path). This is advantageous because, as previously mentioned, due to the dispersion slope of the fiber, only one given wavelength can operate at average zero dispersion. Accordingly, the various channels employed in a WDM system cannot all operate at the wavelength of average zero dispersion. For this reason, as shown in U.S. application Ser. No. 08/759,493, now U.S. Pat. No. 6,137,604, it is useful to divide the usable optical bandwidth of the transmission system into sub-bands that individually undergo dispersion compensation before being re-combined. In comparison to other dispersion compensation techniques, more WDM data channels reside near a wavelength corresponding to the average zero dispersion wavelength. Moreover, since in the present invention the dispersion compensation is provided downstream from the individual transmitting units which arrange the SOPs of the channels, the dispersion compensators advantageously do not need to function in a polarization maintaining environment.

As shown in FIG. 4, the output signal $45_1$ produced by polarization combiner $415_1$ of transmitting unit $42_1$ is directed to dispersion compensating element $44_1$. Output signal $45_1$, corresponds to waveband $20_1$ shown in FIG. 2. Similarly, the output signal $45_2$ produced by polarization combiner $415_2$ of transmitting unit $42_2$ (not shown) is directed to dispersion compensating element $44_2$. In this manner dispersion compensation is provided to output signals $45_1$, $45_2$, . . . $45_8$ by polarization combiners $415_1$, $415_2$, . . . $415_8$, respectively. Finally, dispersion compensated signals $47_1$, $47_2$, . . . $47_8$ are directed to a polarization independent power combiner 48 for multiplexing the signals on output fiber 49.

Figure 5:
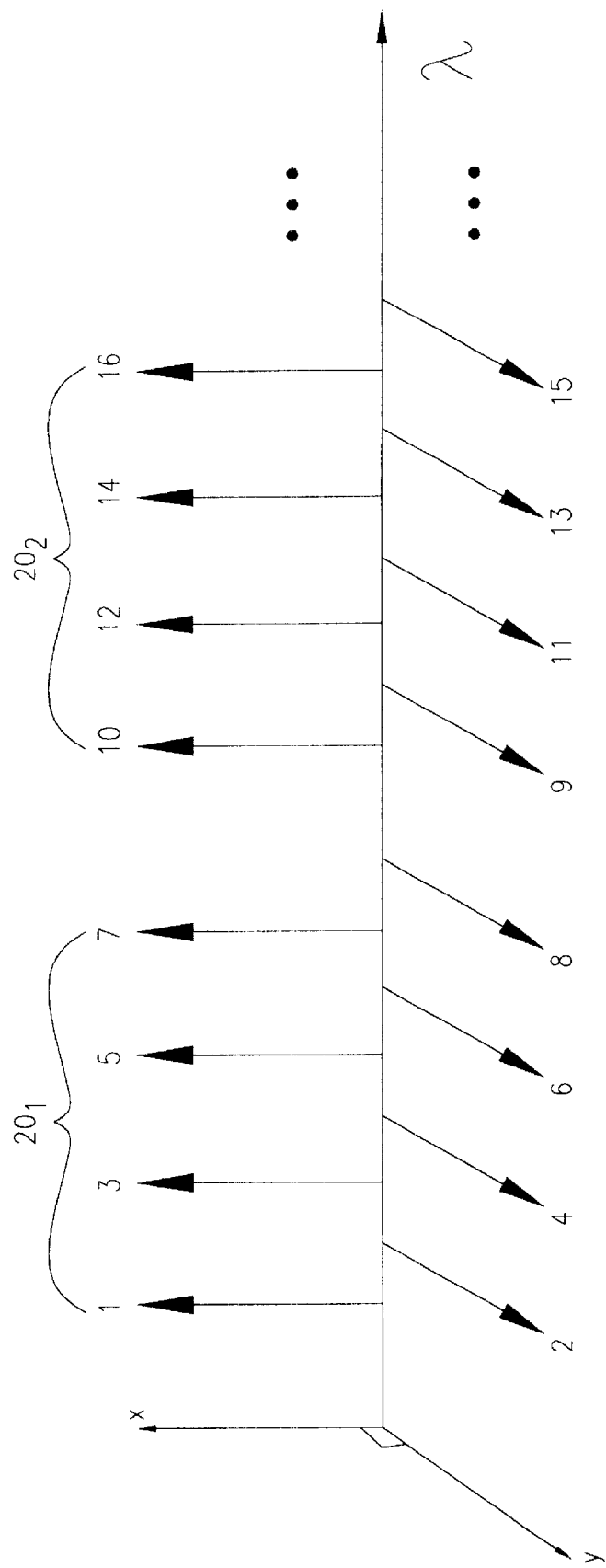
FIG. 5 shows the WDM optical signal provided by the optical transmitter shown in FIG. 4.

FIG. 5 shows the resulting WDM optical signal provided by the inventive transmitter shown in FIG. 4 at some arbitrary instant in time. The channels corresponding to only the first two wavebands $20_1$, and $20_2$ are shown. Within each waveband the odd-numbered channels have SOPs that are substantially orthogonal to the SOPs of the even-numbered channels. That is, the channels within each waveband are arranged in the same manner as the signal shown in FIG. 1. Thus, the preferred substantially orthogonal relationship between SOPs of the odd and even-numbered channels advantageously limits the four-wave mixing products that can be generated among the different channels within a waveband. However, the SOPs of one waveband are uncorrelated with the SOPs of any other waveband. In other words, the orthogonal relationship does not apply to different channels in different wavebands. For example, as shown in FIG. 5, the SOP of channel 8 in waveband $20_1$, is not necessarily orthogonal to the SOP of channel 9 in waveband $20_2$, and in fact channels 8 and 9 may, as indicated, have substantially the same SOPs. As a result, adjacent channels belonging to different wavebands may in fact produce significant four-wave mixing products. For this reason guard bands are provided between wavebands. The guard bands ensure that the spectral separation between adjacent channels in different wavebands is sufficiently great to minimize the channel interaction from the amplitude of the resulting four-wave mixing products even when the channels have the same SOP. For example, in one particular embodiment of the invention the channel spacing within a waveband may be selected to be 0.3 nm while the guard band may have a spacing of 0.6 nm.

Figure 6:
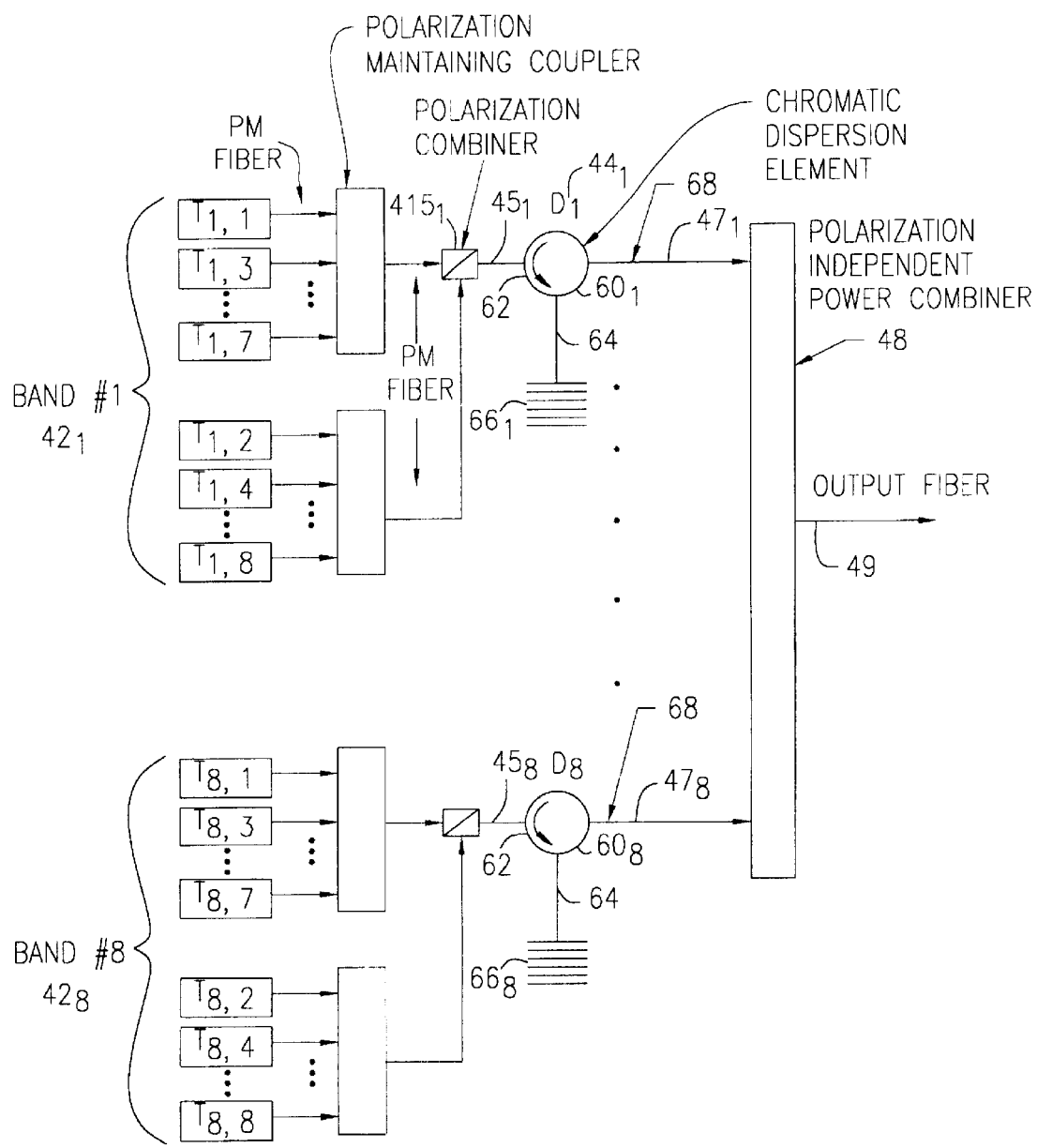
FIG. 6 shows an alternative embodiment of the invention shown in FIG. 4 in which chirped fiber gratings are employed.

The dispersion compensating elements 44 shown in FIG. 4 may be any appropriate element that imparts dispersion, such as a single mode fiber, for example. The invention also contemplates the use of other dispersion compensating elements such as the chirped fiber grating arrangement shown in FIG. 6. The fiber grating may be linearly chirped, or alternatively, it may have a higher order chirp. In FIG. 6, the output signals $45_1$, $45_2$, . . . $45_8$ are directed to the respective input ports 62 of a three port circulator $60_1$, $60_2$, . . . $60_8$. The output signals exit the circulators $60_1$, $60_2$, . . . $60_8$ on output ports 64 and enter chirped fiber gratings $66_1$, $66_2$, . . . $66_3$. The signals reflected by the gratings are returned to the respective circulators $60_1$, $60_2$, . . . $60_8$ via ports 64 and exit the circulators on ports 68 where, as in the previous embodiment of the invention, they are directed to power combiner 48.

Since different wavelengths will penetrate a different number of layers into the chirped fiber gratings before being reflected, the amount of delay imparted to the wavelengths of the optical signals will also be different for different wavelengths. If a quadratically chirped fiber grating is employed, the correct amount of dispersion can be imparted to each of channels in the wavebands. In this case the only limitation on the bandwidth of the individual wavebands will result from the maximum length of fiber grating that can be fabricated. In fact, if a sufficiently long fiber grating can be manufactured (e.g., on the order of ten meters), then it will not be necessary to divide the WDM signal into a large number of bands to provide dispersion compensation. In some cases only two (or even possibly one) bands will be required, reducing by a commensurate amount the number of optical transmitter units that are required.

Figures 7, 8:
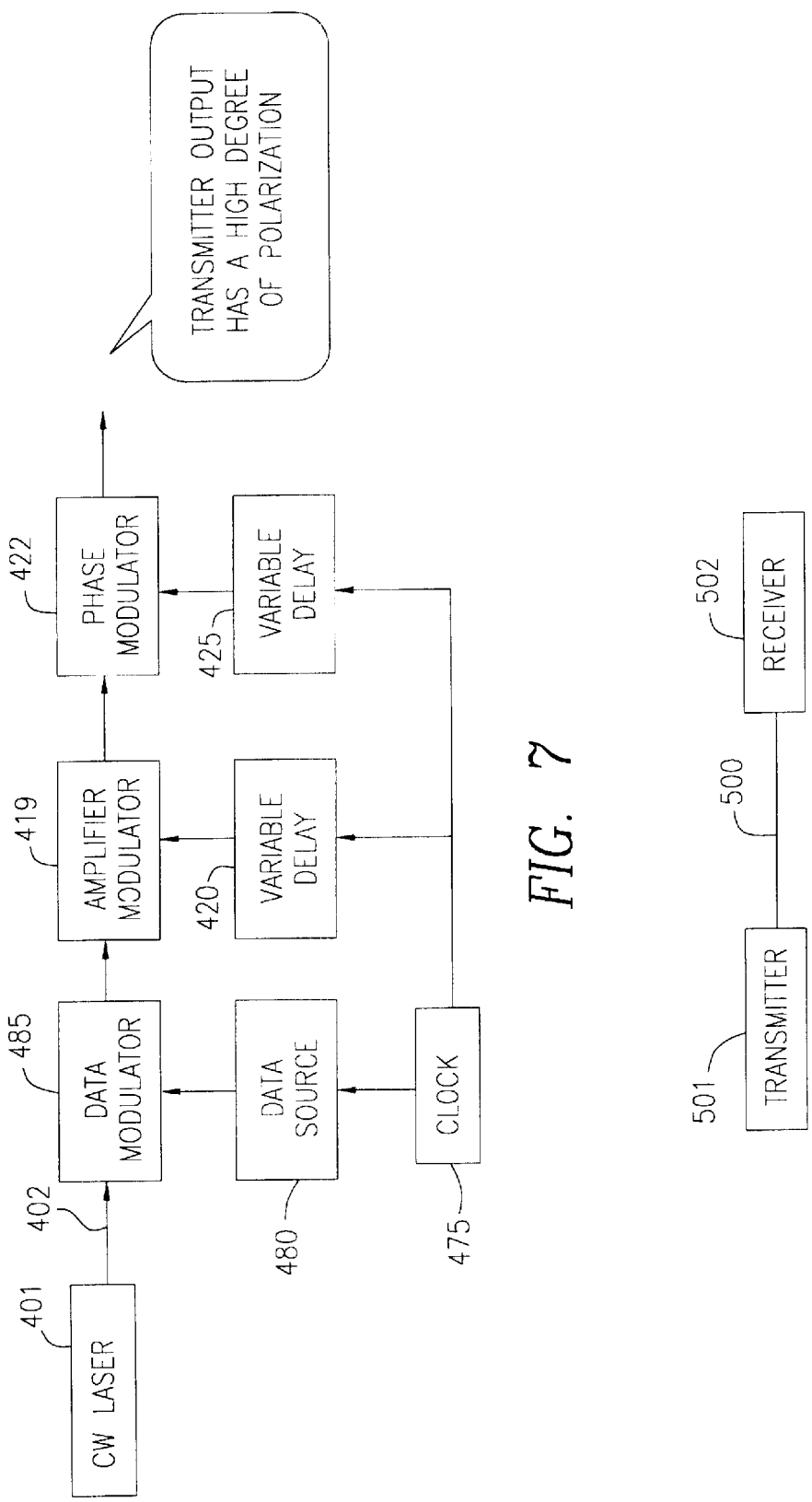
FIG. 7 shows further details of one particular embodiment of one of the optical sources shown in FIG. 3, which employs synchronous amplitude and optical phase modulation.
FIG. 8 shows an exemplary optical communication system that may incorporate the transmitter shown in FIG. 4.
Figure 5:
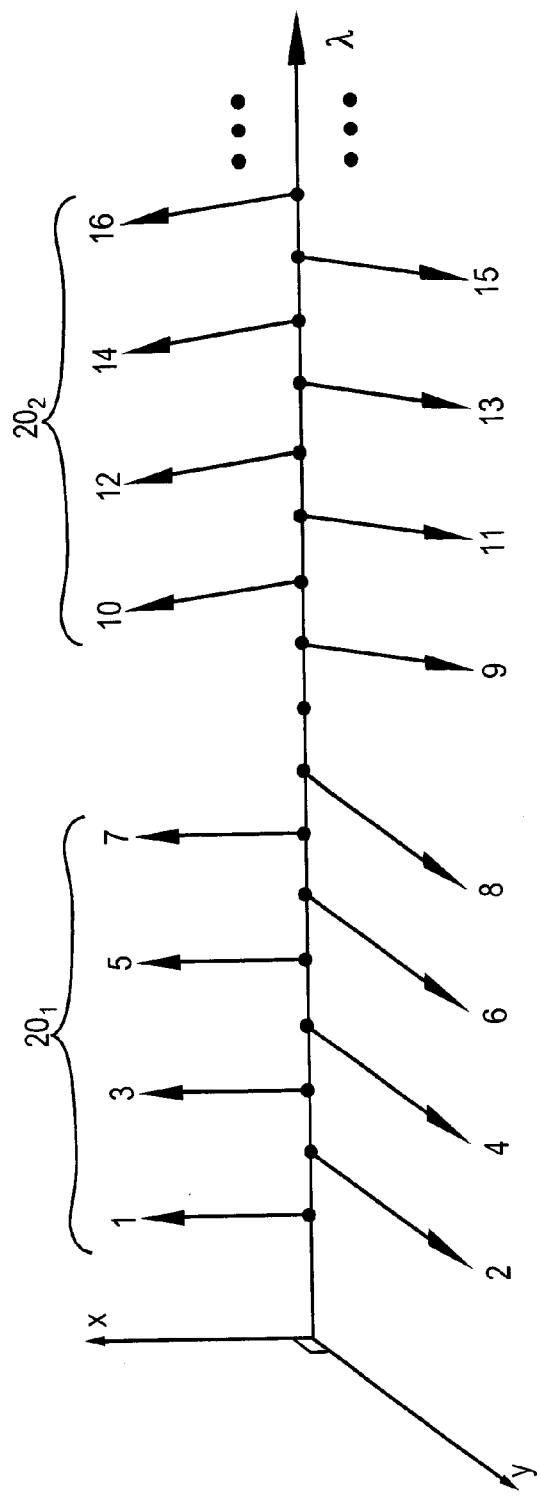

FIG. 7 shows the pertinent details of one particular embodiment of the optical sources $301_1$, $301_2$, . . . $301_N$ shown in FIG. 3 for synchronously imparting data, amplitude and phase modulation to the optical signals. As shown, data modulator 485 receives data to be imparted to the optical signal 402 from data source 480 and modulates the optical signal 402 at a frequency determined by clock 475. The clock 475 also drives amplitude modulator 419 via a variable delay line, for example phase shifter 420. Similarly, clock 475 drives phase modulator 422 via variable delay line 425, which may also be a phase shifter, for example. In operation, the clock 475 causes the rate of amplitude and phase modulation to be frequency and phase locked to the rate of data modulation. Variable delay lines 420 and 425 are utilized to adjust the relative timing among the data, amplitude and phase modulation. The manner in which clock 475 drives data modulator 485, amplitude modulator 419, and phase modulator 422 and the operational details of variable delay lines 420 and 425 are further described in U.S. Pat. No. 5,526,162. One of ordinary skill in the art will recognize that the invention is also applicable to optical transmitters that employ various modulation formats such as solitons, for example.

It should be recognized that the pair-wise orthogonal relationship of the optical channels provided in accordance with the present invention will not be maintained over the entire transmission path of the system because of an unavoidable degree of polarization mode dispersion (PMD). However, since current communication systems use relatively small channel spacings and optical fibers having a PMD less than about $0.1$ ps/$\sqrt{km}$, the correlation between the polarization states of the channels will be high for nearest neighbors. Since nonlinear mixing primarily occurs between neighboring channels, the present technique will nevertheless substantially reduce the effects of four-wave mixing. Moreover, although the degree of polarization of optical signal 305 will be small, PMD may increase it. But again, if low PMD fibers and a large number of channels are employed, the degree of polarization should remain small. If this re-polarization causes excess noise to accumulate from polarization hole-burning in the optical amplifiers, then, in accordance with U.S. Pat. Nos. 5,309,530 and 5,309,535, a relatively slow speed polarization scrambler may be placed at the output of polarization coupler 315.

FIG. 8 shows a simplified block diagram of an exemplary optical fiber transmission system that employs the transmitter of the present invention. The system includes an optical transmission path 500, a transmitting terminal 501, and a receiving terminal 502. The transmitting terminal 501 corresponds to the transmitter 40 shown in FIG. 4. The optical signal presented by the terminal 501 to the transmission path 500 may comprise a plurality of WDM optical carriers each carrying an SDH signal. The transmission path may include dispersion compensators. The transmission path 500 also includes optical amplifiers (not shown), which may be EDFAs, for example, which amplify optical signals in the 1550 wavelength band. In one embodiment of the invention the transmission fibers may be dispersion shifted single-mode fibers with an average zero dispersion wavelength higher than the operating wavelengths of the system.

What is claimed is:

1. A method of transmitting a WDM optical signal having a total number channels dividable into a prescribed number of wavebands, said method comprising the steps of:

generating a first series of optical signals corresponding to each of the wavebands, each of the first series of optical signals including a plurality of optical channels wherein said plurality of optical channels in each of the wavebands are sequentially numbered from lowest to highest wavelength; and for each waveband, orienting a state-of-polarization of predetermined odd-numbered channels to be substantially orthogonal to a state of polarization of predetermined even-numbered channels by directing said predetermined odd-numbered channels and said predetermined even-numbered channels through orthogonally polarizing inputs of a coupler;

imparting dispersion compensation to each of the wavebands;

combining the dispersion compensated wavebands to form the WDM optical signal for transmission onto an optical transmission path.

2. The method as claimed in claim 1 further comprising, for each waveband, the step of directing said odd-numbered channels and said even-numbered channels through first and second wavelength combiners, respectively, prior to orienting said states of polarization.

3. The method as claimed in claim 2 further including the step of modulating data onto at least one channel of said wavelength division multiplexed optical signal at a predetermined frequency.

4. The method as claimed in claim 3 further comprising the step of re-modulating the amplitude of said at least one channel at said predetermined frequency.

5. The method as claimed in claim 3 further including the step of selectively varying the phase of said at least one channel.

6. The method as claimed in claim 5 wherein said step of selectively phase modulating includes the step of selectively phase modulating at a frequency equal to said predetermined frequency at which data is modulated.

7. The method of claim 1 wherein the plurality of channels in each waveband have spectral separations that are less than the spectral separation between adjacent wavebands.

8. The method of claim 1 wherein at least two of the wavebands have a different number of optical channels.

9. The method as claimed in claim 1 wherein the generating step for each waveband includes the step of generating said odd-numbered channels in a first polarization state and said even-numbered channels in a second polarization state.

10. The method as claimed in claim 1 wherein at least one of said channels is generated by a laser.

11. The method as claimed in claim 10 wherein said laser comprises a wavelength tunable laser.

12. The method as claimed in claim 10 wherein said laser generates a continuous wave optical signal.

13. The method of claim 1 wherein said plurality of optical channels have adjustable power levels.

14. The method of claim 1 wherein dispersion compensation is imparted by a chirped fiber grating.

15. The method of claim 14 wherein said chirped fiber grating is quadratically chirped.

16. The method of claim 14 wherein said chirped fiber grating is linearly chirped.

17. An optical transmitter for transmitting a wavelength division multiplexed optical signal having a total number of channels dividable into a prescribed number of wavebands, comprising:

a plurality of optical transmitter units equal in number to the prescribed number of wavebands, each of said transmitter units including:

a plurality of 1, 2, . . . N optical sources for generating a plurality of N optical channels;

a first (N/2) by 1 multiplexer coupled to predetermined even-numbered optical sources for combining even-numbered optical channels into a first wavelength division multiplexed optical signal;

a second (N/2) by 1 multiplexer coupled to predetermined odd-numbered optical sources for combining odd-numbered optical channels into a second wavelength division multiplexed optical signal;

a first coupler having first and second inputs respectively coupled to said first and second multiplexers such that a wavelength division multiplexed (WDM) optical signal is produced in which said odd-numbered optical channels have a state of polarization that is substantially orthogonal to said even numbered optical channels;

a dispersion compensating element receiving said WDM optical signal from the first coupler;

a second coupler having a plurality of inputs equal in number to the prescribed number of wavebands for respectively receiving the WDM optical signals from the dispersion compensating elements.

18. The transmitter of claim 17 wherein N is an integer having a common value for each of the optical transmitter units.

19. The transmitter of claim 17 wherein N is an integer having different values for at least two of said optical transmitter units.

20. The transmitter of claim 19 wherein said coupler is a polarization coupler.

21. The transmitter of claim 19 wherein said coupler is a directional coupler.

22. The transmitter of claim 17 wherein a spectral separation between adjacent channels in different wavebands is greater than a spectral separation between adjacent channels within any one of the prescribed wavebands.

23. The apparatus as claimed in claim 17 wherein at least one optical source comprises a laser.

24. The apparatus as claimed in claim 23 wherein said laser generates a continuous-wave optical channel.

25. The apparatus as claimed in claim 17 further including at least one data modulator coupled to at least one of said plurality of optical sources for modulating data from at least one data source onto predetermined ones of said optical channels.

26. The apparatus as claimed in claim 17 further including a clock, for establishing a predetermined frequency, said clock being coupled to said at least one data source, and said data source being coupled to said at least one data modulator, wherein said data is modulated onto at least one optical channel at a rate that is phase locked and substantially equal to said predetermined frequency.

27. The apparatus as claimed in claim 26 further comprising a variable delay line coupling said clock to said data modulator.

28. The apparatus as claimed in claim 27 wherein said variable delay line comprises a phase shifter.

29. The apparatus as claimed in claim 27 further including an optical phase modulator for modulating said data modulated optical channel at said predetermined frequency.

30. The apparatus as claimed in claim 29 further including an amplitude modulator for re-modulating said data modulated optical channel at said predetermined frequency.

31. The apparatus as claimed in claim 30 further comprising a third variable delay line coupling said clock to said amplitude modulator for selectively varying said amplitude modulation provided by said amplitude modulator.

32. The apparatus as claimed in claim 31 wherein said variable delay line is a phase shifter.

33. The apparatus as claimed in claim 29 further comprising a second variable delay line coupling said clock to said optical phase modulator for selectively varying said optical phase modulation provided by said optical phase modulator.

34. The apparatus as claimed in claim 33 wherein said variable delay line is a phase shifter.

35. The transmitter of claim 17 wherein said dispersion compensating element is a chirped fiber grating.

36. The transmitter of claim 35 wherein said chirped fiber grating is linearly chirped.

37. The transmitter of claim 35 wherein said chirped fiber grating is quadratically chirped.

38. A WDM transmission system comprising:
    a transmitter and a receiver;
    an optical transmission path coupling said transmitter to said receiver;
    wherein said transmitter includes:
        a plurality of optical transmitter units equal in number to a prescribed number of wavebands, each of said transmitter units including:
            a plurality of 1, 2, . . . N optical sources for generating a plurality of N optical channels;
            a first (N/2) by 1 multiplexer coupled to predetermined even-numbered optical sources for combining even-numbered optical channels into a first wavelength division multiplexed optical signal;
            a second (N/2) by 1 multiplexer coupled to predetermined odd-numbered optical sources for combining odd-numbered optical channels into a second wavelength division multiplexed optical signal;
            a first coupler having first and second inputs respectively coupled to said first and second multiplexers such that a wavelength division multiplexed (WDM) optical signal is produced in which said odd-numbered optical channels have a state of polarization that is substantially orthogonal to said even numbered optical channels;
            a dispersion compensating element receiving said WDM optical signal from the first coupler;
        a second coupler having a plurality of inputs equal in number to the prescribed number of wavebands for respectively receiving the WDM optical signals from the dispersion compensating elements.

39. The transmitter of claim 38 wherein N is an integer having a common value for each of the optical transmitter units.

40. The transmitter of claim 38 wherein N is an integer having different values for at least two of said optical transmitter units.

41. The transmitter of claim 38 wherein a spectral separation between adjacent channels in different wavebands is greater than a spectral separation between adjacent channels within any one of the prescribed wavebands.

42. The system as claimed in claim 38 wherein at least one optical source comprises a laser.

43. The system as claimed in claim 42 wherein said laser comprises a wavelength-tunable laser.

44. The system as claimed in claim 42 wherein said laser generates a continuous-wave optical channel.

45. The system as claimed in claim 38 further including at least one data modulator. coupled to at least one of said plurality of optical sources for modulating data from at least one data source onto predetermined ones of said optical channels.

46. The system as claimed in claim 38 further including a clock, for establishing a predetermined frequency, said clock being coupled to said at least one data source, and said data source being coupled to said at least one data modulator, wherein said data is modulated onto at least one optical channel at a rate that is phase locked and substantially equal to said predetermined frequency.

47. The system as claimed in claim 46 further comprising a variable delay line coupling said clock to said data modulator.

48. The system as claimed in claim 47 wherein said variable delay line comprises a phase shifter.

49. The system as claimed in claim 48 further including an optical phase modulator for modulating said data modulated optical channel at said predetermined frequency.

50. The system as claimed in claim 49 further including an amplitude modulator for modulating said data modulated optical channel at said predetermined frequency.

51. The system as claimed in claim 50 further comprising a second variable delay line coupling said clock to said optical phase modulator for selectively varying said optical phase modulation provided by said optical phase modulator.

52. The system as claimed in claim 51 wherein said second variable delay line is a phase shifter.

53. The system as claimed in claim 51 further comprising a third variable delay line coupling said clock to said amplitude modulator for selectively varying said amplitude modulation provided by said amplitude modulator.

54. The transmitter of claim 38 wherein said coupler is a polarization coupler.

55. The transmitter of claim 38 wherein said coupler is a directional coupler.

56. The system of claim 38 wherein said dispersion compensating element is a chirped fiber grating.

57. The system of claim 56 wherein said chirped fiber grating is linearly chirped.

58. The system of claim 56 wherein said chirped fiber grating is quadratically chirped.

* * * * *

UNITED STATES PATENT AND TRADEMARK OFFICE
CERTIFICATE OF CORRECTION

PATENT NO. : 6,459,515 B1
DATED : October 1, 2002
INVENTOR(S) : Neal S. Bergano

It is certified that error appears in the above-identified patent and that said Letters Patent is hereby corrected as shown below:

Drawings,
Fig. 5, substitute attached for original.

Column 3,
Line 64, "chaniel" should read -- channel --.

Signed and Sealed this

Twenty-fourth Day of August, 2004

JON W. DUDAS
*Director of the United States Patent and Trademark Office*